US012124569B2

(12) United States Patent
Zhang

(10) Patent No.: US 12,124,569 B2
(45) Date of Patent: Oct. 22, 2024

(54) COMMAND INSPECTION METHOD AND APPARATUS, COMPUTER DEVICE, AND STORAGE MEDIUM

(71) Applicant: Tencent Technology (Shenzhen) Company Limited, Shenzhen (CN)

(72) Inventor: Yao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 575 days.

(21) Appl. No.: 17/320,015

(22) Filed: May 13, 2021

(65) Prior Publication Data

US 2021/0264023 A1  Aug. 26, 2021

Related U.S. Application Data

(63) Continuation of application No. PCT/CN2020/079484, filed on Mar. 16, 2020.

(30) Foreign Application Priority Data

Mar. 29, 2019  (CN) .......................... 201910249360.8

(51) Int. Cl.
  *G06F 21/55*   (2013.01)
  *G06F 21/53*   (2013.01)
(52) U.S. Cl.
  CPC ............ *G06F 21/552* (2013.01); *G06F 21/53* (2013.01); *G06F 2221/033* (2013.01)
(58) Field of Classification Search
  None
  See application file for complete search history.

(56) References Cited

U.S. PATENT DOCUMENTS 9,516,055 B1 * 12/2016 Liu ..................... H04L 63/1416
9,635,039 B1 *  4/2017 Islam .................... H04L 63/145
(Continued)

FOREIGN PATENT DOCUMENTS

CN       102254120 A      11/2011
CN       103761481 A       4/2014
(Continued)

OTHER PUBLICATIONS

Ma et al., High-Interaction Honeypot system for SQL Injection Analysis; 2011; retrieved from the Internet https://ieeexplore.ieee.org/document/6113637; pp. 1-4, as printed. (Year: 2011).*

(Continued)

*Primary Examiner* — Michael W Chao
(74) *Attorney, Agent, or Firm* — Morgan, Lewis & Bockius LLP

(57) ABSTRACT

Provided is a command inspection method, including: inspecting a plurality of to-be-inspected commands based on a plurality of first features of known obfuscated commands and a plurality of second features of normal service commands, to determine a plurality of target commands, each of the target commands being a command having one or more of the first features but none of the second features; obtaining running state text of the plurality of target commands; obtaining suspicious degree information of the plurality of target commands based on the plurality of target commands and the corresponding running state text, the suspicious degree information being used for indicating a possibility that a command is an obfuscated command; and determining, when suspicious degree information of any target command satisfies a target condition, the target command as an obfuscated command.

20 Claims, 6 Drawing Sheets

(56) References Cited

U.S. PATENT DOCUMENTS

| | | | |
|---|---|---|---|
| 9,697,108 B2* | 7/2017 | Ligman | G06F 11/3688 |
| 10,296,444 B1* | 5/2019 | Choudhary | G06F 11/3664 |
| 10,558,809 B1* | 2/2020 | Joyce | G06N 5/046 |
| 11,620,379 B1* | 4/2023 | Hegde | G06N 3/04 |
| | | | 706/23 |
| 11,895,135 B2* | 2/2024 | Kapoor | G06F 21/57 |
| 11,909,752 B1* | 2/2024 | Kapoor | H04L 67/306 |
| 11,973,784 B1* | 4/2024 | Erlingsson | H04L 67/535 |
| 12,019,740 B2* | 6/2024 | Trost | G06F 16/26 |
| 12,055,997 B2* | 8/2024 | Barthur | G06F 18/2155 |
| 2006/0253906 A1* | 11/2006 | Rubin | H04L 63/20 |
| | | | 726/23 |
| 2008/0141228 A1 | 6/2008 | Jeong | |
| 2009/0282483 A1* | 11/2009 | Bennett | H04L 63/1416 |
| | | | 726/23 |
| 2012/0260342 A1* | 10/2012 | Dube | G06F 21/564 |
| | | | 726/24 |
| 2014/0090061 A1* | 3/2014 | Avasarala | G06F 21/566 |
| | | | 726/24 |
| 2016/0337400 A1* | 11/2016 | Gupta | H04L 63/1416 |
| 2017/0185927 A1* | 6/2017 | Curcic | H04L 41/5032 |
| 2017/0195353 A1* | 7/2017 | Taylor | H04L 63/1425 |
| 2017/0262633 A1 | 9/2017 | Miserendino et al. | |
| 2018/0060569 A1* | 3/2018 | Kim | G06F 21/55 |
| 2018/0129552 A1* | 5/2018 | Boutnaru | G06F 11/0793 |
| 2018/0253551 A1* | 9/2018 | Chalmandrier-Perna | |
| | | | G06F 21/554 |
| 2018/0255093 A1 | 9/2018 | Doron et al. | |
| 2018/0276382 A1* | 9/2018 | Khandhar | G06F 21/563 |
| 2018/0322284 A1* | 11/2018 | Chiang | G06F 21/577 |
| 2021/0117544 A1* | 4/2021 | Kurtz | G06F 21/566 |
| 2021/0185062 A1* | 6/2021 | Cheetancheri | H04L 63/1416 |
| 2024/0121266 A1* | 4/2024 | Egbert | H04L 63/1466 |

FOREIGN PATENT DOCUMENTS

| | | |
|---|---|---|
| CN | 105022960 A | 11/2015 |
| CN | 105260662 A | 1/2016 |
| CN | 107657175 A | 2/2018 |
| CN | 108460277 A | 8/2018 |
| CN | 109033835 A | 12/2018 |
| CN | 109388623 A | 2/2019 |
| CN | 110012000 A | 7/2019 |

OTHER PUBLICATIONS

Xu et al.; JStill: Mostly Static Detection of Obfuscated Malicious JavaScript Code; 2013; retrieved from the Internet https://dl.acm.org/doi/abs/10.1145/2435349.2435364; pp. 1-12, as printed. (Year: 2013).*

Dong Zhang et al., "Research on Host Malcode Detection Using Machine Learning", Chinese Journal of Network and Information Security, vol. 3. No. 7, Jul. 31, 2017, 8 pgs.

Tencent Technology, ISR, PCT/CN2020/079484, Jun. 5, 2020, 3 pgs.

Tencent Technology, WO, PCT/CN2020/079484, Jun. 5, 2020, 5 pgs.

Tencent Technology, IPRP, PCT/CN2020/079484, Sep. 28, 2021, 6 pgs.

* cited by examiner

COMMAND INSPECTION METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2020/079484, entitled "COMMAND INSPECTION METHOD AND APPARATUS, COMPUTER DEVICE, AND STORAGE MEDIUM" filed on Mar. 16, 2020, which claims priority to Chinese Patent Application No. 2019102493608, entitled "COMMAND INSPECTION METHOD AND APPARATUS, COMPUTER DEVICE, AND STORAGE MEDIUM" and filed with the China National Intellectual Property Administration on Mar. 29, 2019, both of which are incorporated herein by reference in its entirety.

FIELD OF THE TECHNOLOGY

This application relates to the field of network technologies, and in particular, to a command inspection method and apparatus, a computer device, and a storage medium.

BACKGROUND OF THE DISCLOSURE

Internet applications are becoming indispensable in people's life. Each network application is supported by tens of thousands of servers. Personal data of users and business data of services are also stored in these servers. Therefore, how to ensure the operation security of the servers becomes particularly important for every Internet company.

There are numerous ways for attackers to intrude. Regardless of the way of invasion, once an attacker penetrates a system, he never fails to perform corresponding operations, to achieve the invasion. Such operations may be implemented by delivering malicious commands. In conventional defense methods, commands reported by servers are usually checked. For example, the reported commands are matched against a known malicious command set, to learn which commands are malicious. However, because the malicious command set is also easy to be learned by an attacker, the attacker usually performs grammar deformation on actually executed commands by using a grammatical function allowed by default in an operating system, causing that the commands cannot be intuitively read and understood. This technology is referred to as command obfuscation herein. The use of command obfuscation causes a complete failure of conventional defense inspection methods. Therefore, there is an urgent need for a command inspection method that can improve the inspection accuracy.

SUMMARY

Various embodiments of this application provide a command inspection method and apparatus, a computer device, and a readable storage medium.

A command inspection method is provided, performed by a computer device, the method including:
  inspecting a plurality of to-be-inspected commands based on a plurality of first features of known obfuscated commands and a plurality of second features of normal service commands, to determine a plurality of target commands, each of the target commands being a command having one or more of the first features but none of the second features;
  obtaining running state text of the plurality of target commands;
  obtaining suspicious degree information of the plurality of target commands based on the plurality of target commands and the corresponding running state text, the suspicious degree information being used for indicating a possibility that a command is an obfuscated command; and
  determining, when suspicious degree information of any target command satisfies a target condition, the target command as an obfuscated command.

A command inspection apparatus is provided, disposed in a computer device, the apparatus including:
  an inspection module, configured to inspect a plurality of to-be-inspected commands based on a plurality of first features of known obfuscated commands and a plurality of second features of normal service commands, to determine a plurality of target commands, each of the target commands being a command having one or more of the first features but none of the second features;
  a text format obtaining module, configured to obtain running state text of the plurality of target commands;
  a suspicious degree information obtaining module, configured to obtain suspicious degree information of the plurality of target commands based on the plurality of target commands and the corresponding running state text, the suspicious degree information being used for indicating a possibility that a command is an obfuscated command; and
  a command determining module, configured to determine, when suspicious degree information of any target command satisfies a target condition, the target command as an obfuscated command.

A computer device is provided, including one or more processors and a memory, the memory storing at least one computer-readable instruction, the computer-readable instruction being loaded and executed by the one or more processors to implement the foregoing command inspection method.

One or more non-transitory computer-readable storage mediums are provided, storing at least one computer-readable instruction, the computer-readable instruction being loaded and executed by one or more processors to implement the foregoing command inspection method.

Details of one or more embodiments of this application are provided in the accompanying drawings and descriptions below. Based on the specification, the accompanying drawings, and the claims of this application, other features, objectives, and advantages of this application become clearer.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings. It is to be understood that the specific implementations described herein are only used to describe this application, instead of limiting this application.

Figure 1:
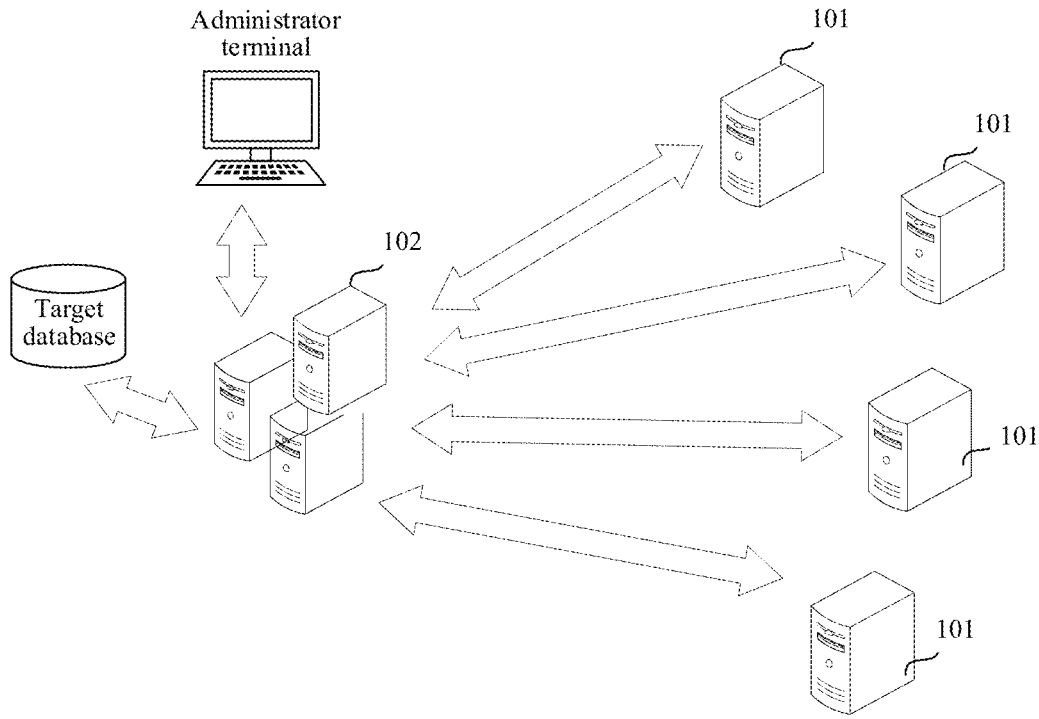
FIG. 1 is a schematic diagram of an implementation environment of a command inspection method according to an embodiment of this application.

FIG. 1 is a schematic diagram of an implementation environment of a command inspection method according to an embodiment of this application. The implementation environment may include devices such as at least one server 101, at least one server 102, and an administrator terminal. The at least one server 101 may be configured to provide services for users. In addition, the at least one server 101 may perform reporting to the at least one server 102 based on commands running on the server. The reported content may include full data of execution, that is, the executed commands, processes related to the commands, and a network connection status, and the like. The reporting may be alternatively performed by using a data acquisition device (such as agent) configured by the server 101. The at least one server 102 may inspect a plurality of to-be-inspected commands based on reported commands, a plurality of first features of known obfuscated commands, and a plurality of second features of normal service commands, to determine a plurality of target commands, so as to implement preliminary screening for the commands, and obtain some target commands that are suspected to be obfuscated commands. Then, the server obtains running state text of the target commands, to learn operations performed when the target commands are run, thereby determining suspicious degree information of the target commands based on the target commands and the running state text, may determine whether a target command is an obfuscated command by using the suspicious degree information, and may further perform, after the obfuscated command is determined, alerting on the determined obfuscated command, for example, alert an administrator terminal and alert a related server. Certainly, the server 102 may further transmit the determined obfuscated command to the administrator terminal for manually inspection by a skilled person, to determine whether the command is the obfuscated command, and further determine whether to perform subsequent alerting. Certainly, in a processing process of the at least one server 102, database storage may be further involved. For example, for the target database shown in FIG. 1, after preliminarily screened, commands reported by the server may be stored in the target database. When running state text of the commands stored in the target database is obtained, the running state text may be further stored in the target database, to facilitate in further performing command inspection and the like based on the target database again. This is not specifically limited in this embodiment of this application.

Figure 2:
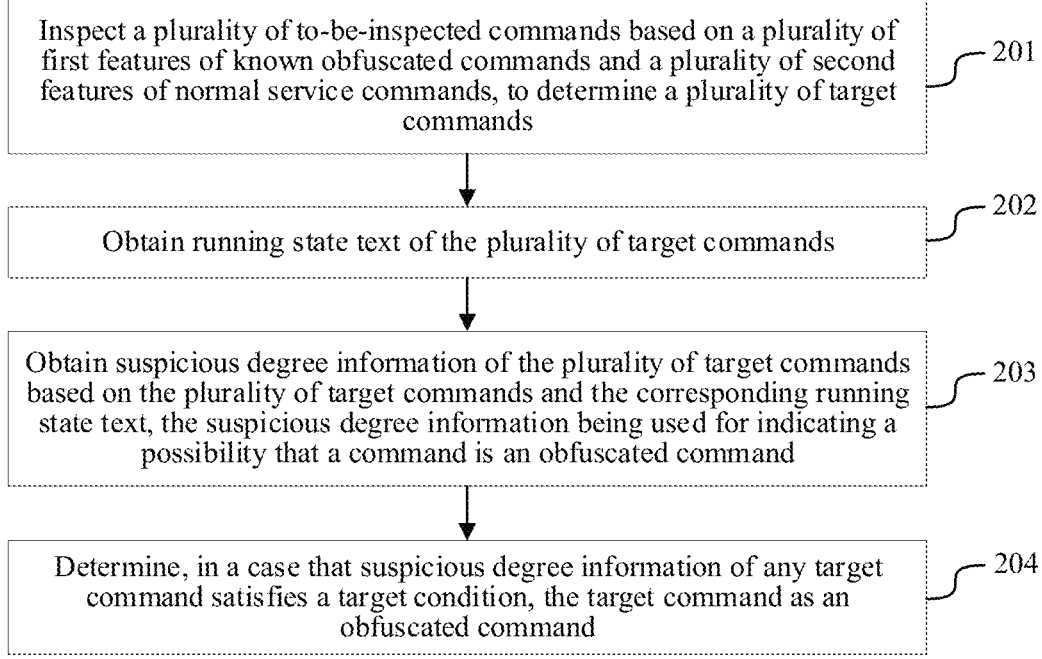
FIG. 2 is a flowchart of a command inspection method according to an embodiment of this application.

FIG. 2 is a flowchart of a command inspection method according to an embodiment of this application. In the embodiment shown in FIG. 2, an example in which a computer device is used as an execution body of the method is used for description. The embodiment specifically includes the following steps:

201. Inspect a plurality of to-be-inspected commands based on a plurality of first features of known obfuscated commands and a plurality of second features of normal service commands, to determine a plurality of target commands, each of the target commands being a command having one or more of the first features but none of the second features.

The plurality of first features are features extracted based on known obfuscated commands, and the second features are features extracted based on known normal service commands. The two types of features are inspected, to achieve screening, and the obtained target commands are some suspected obfuscated commands. Through the inspection process, a quantity of commands required to be processed subsequently may be reduced.

202. Obtain running state text of the plurality of target commands.

The running state text is used for describing operations performed by the target commands during execution, which can reflect operations performed by a command during actual execution, to learn, based on the operations corresponding to the command, whether the command is an obfuscated command.

203. Obtain suspicious degree information of the plurality of target commands based on the plurality of target commands and the corresponding running state text, the suspicious degree information being used for indicating a possibility that a command is an obfuscated command.

In this embodiment of this application, the target commands and the corresponding running state text may indicate that the target commands themselves and corresponding operations when the target commands are actually executed. Therefore, whether a command is obfuscated may be learned by comparing the foregoing information or in another manner. For example, whether commands are obfuscated commands may be comprehensively determined by using situations such as a text difference between the commands and running state text, features matching the commands, and whether the commands are some preset commands.

204. Determine, when suspicious degree information of any target command satisfies a target condition, the target command as an obfuscated command.

When a target command is determined as an obfuscated command based on the suspicious degree information, a target device may be alerted based on a system setting. For example, the system setting is to alert a source server. Therefore, a source server of the target commands may be determined, and alerting information is transmitted to the source server. The alerting information may include the target command and related processes of the target command. Certainly, if the system setting is to alert an administrator terminal, alerting information may be transmitted to the administrator terminal. In this case, the alerting information may include the target command and a source server, and may further include related processed of the target command, to facilitate the administrator terminal in positioning the target command.

In this embodiment of this application, for a large-scale server application scenario, an operable real-time inspection method for an obfuscated command is provided, which greatly improves the defense effect, and provides a more flexible inspection method. Specifically, analysis of static and dynamic obfuscation attributes of commands are combined in this embodiment of this application. First, static feature matching and screening are performed on reported commands by using first features obtained based on known obfuscated commands and second features obtained based on normal service commands, thereby significantly reducing the scale of data analysis, and making real-time command inspection possible, and running state text of the commands are obtained, to implement a certain degree of a deobfuscation function, avoiding a difficult in calculation and time consuming caused by semantic analysis. Then, suspicious degree information is determined by using commands and the running state text, to finally determine whether the commands are obfuscated commands, thereby greatly improving the inspection accuracy. Certainly, as the accuracy improves, the possibility of misreporting is greatly reduced. Therefore, a suspicious deformed obfuscated command is accurately recognized, the effective perception capability for advanced threat invasion means is improved, and the security protection effect of the server can also be significantly enhanced.

Figure 3:
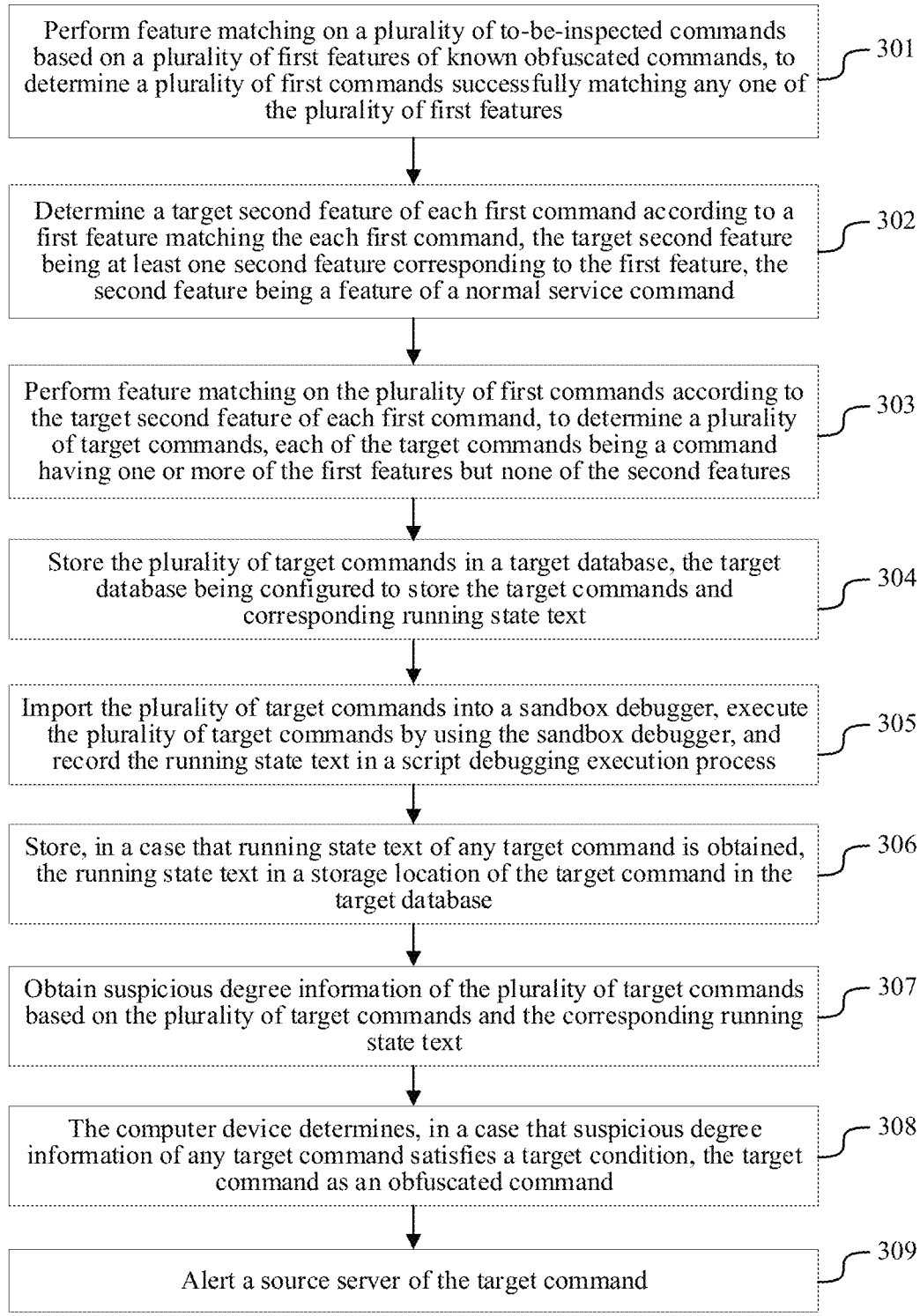
FIG. 3 is a flowchart of a command inspection method according to an embodiment of this application.

FIG. 3 is a flowchart of a command inspection method according to an embodiment of this application. In the embodiment shown in FIG. 3, an example in which a computer device is used as an execution body of the method is used for description. The embodiment specifically includes the following steps:

301. Perform feature matching on a plurality of to-be-inspected commands based on a plurality of first features of known obfuscated commands, to determine a plurality of first commands successfully matching at least one of the plurality of first features.

The plurality of first features may be obtained according to the following process: obtaining a plurality of known obfuscated commands, and determining common features of the plurality of known obfuscated commands as the first features. The first feature may be used for indicating an obfuscation type. Certainly, one obfuscation type may correspond to one or more first features. For example, when the common features of the plurality of known obfuscated commands are determined, clustering may be performed on the plurality of known obfuscated commands, to obtain a plurality of command sets. A known obfuscated command in a clustering center of any command set is determined, the known obfuscated command in the clustering center is analyzed, and an obfuscation type obtained through analysis is extracted to be a first feature corresponding to the command set.

In one embodiment, common features in different granularities of the plurality of known obfuscated commands are extracted based on different generalization degrees. A higher generalization degree indicates less common features. Conversely, a lower generalization degree indicates more common features. Certainly, as malicious samples, that is, the known obfuscated commands, constantly increase, first features in each obfuscation manner may be alternatively updated, to improve the accuracy.

The known obfuscated commands may be configured based on historical execution of a server or acquired in a network by a skilled person. Sources of the known obfuscated commands used as the malicious samples are not limited in this embodiment of this application. The plurality of to-be-inspected commands may be reported by a server. Specifically, the server may acquire commands by using a data acquisition device disposed on a server side, and report the commands. Certainly, when a command running on the server is reported, an executive process, a parent process, a process state of the command, an event time, service information, and running data of network connection may also be uploaded.

When step 301 is performed, the computer device may first extract commands in the running data, and then input the commands to a feature filtering ring formed by the plurality of first features. Each command is matched against each first feature on the feature filtering ring. When any command successfully matches any feature, the command is used as a result of screening and outputted to a next feature matching process. The feature matching process may be duplicating the plurality of to-be-inspected commands based on a quantity of the first features, to obtain a plurality of duplications, each duplication including the plurality of to-be-inspected commands, and performing feature matching between all the to-be-inspected commands in each duplication and the same first feature, to determine commands matching the first feature in the plurality of to-be-inspected commands. Therefore, a process that all the to-be-inspected commands are matched against all the first features is ensured, which can ensure that no obfuscated command is omitted.

In the foregoing feature matching process, some static features for representing obfuscation types can be determined based on the known obfuscated commands, to represent some commonalities of the known obfuscated commands, and the reported commands are screened based on the static features, so that regular commands having no obfuscation feature may be removed, and commands matching the static features may be outputted.

In some embodiments, the plurality of first features may include, but are not limited to, the following features:

(a) Variable name obfuscation, that is, there is an operation of assigning a value by using a symbol "$", and the operation is repeated at least once in the same command. Using an original command "cat/etc/passwd" as an example, an obfuscated command is, for example: "a=ca;b=t;c=pas;d=swd;$a$b/etc/$c$d".

(b) IFS misusing, that is, splitting an original command by using a predefined character variable "IFS", to achieve the obfuscation. Using an original command "cat/etc/passwd" as an example, an obfuscated command is, for example: "cat/et${IFS}c/pas${IFS}swd".

(c) Displacement control, that is, selecting a grammar by using a displacement allowed by a Linux environment, to hide an actually executed command character. Using an original command "cat/etc/passwd" as an example, an obfuscated command is, for example: "a=ppasswddd;cat/etc/${a:1:6}".

(d) Base64 encoding, that is, hiding an executed command by using base64 encoding. An obfuscated command is, for example: "'echo Y2F0IC9ldGMvcGFzc3dkCg==|base64-d'".

(e) Encoding in another number system, that is, encoding an original command in a number system other than binary, for example, encoding the original command through hexadecimal encoding.

Using an original command "cat/etc/passwd" as an example, an obfuscated command is, for example: "'echo $'\x63\x61\x74\x30\x2f\x65\x74\x63\x2f\x70\x61\x73\x73\x77\x64'".

(f) Rot13 encryption, that is, hiding an executed command in a substitution cipher manner. Using an original command "cat/etc/passwd" as an example, an obfuscated command is, for example: "'echo png/rgp/cnffjq|tr a-mn-z n-za-m'".

(g) Reversing, that is, reversing an original command by using a rev function, to implement obfuscation deformation. Using an original command "cat/etc/passwd" as an example, an obfuscated command is, for example: "'echo dwssap/cte/tac|rev'".

(h) Echo bypass, that is, achieving an effect of hiding an original command by using an echo command. Using an original command "cat/etc/passwd" as an example, an obfuscated command is, for example: "$(echo ca)t/$(echo etc)/$(echo pas)swd".

(i) Wildcard character obfuscation, that is, performing obfuscation deformation on an original command by using "*" and "?" that are recognizable by a system as wildcard characters, to escape high-risk baseline monitoring. Using an original command "cat/etc/passwd" as an example, an obfuscated command is, for example: "cat/et?/p*assw?".

The examples of features are merely some embodiments provided in this embodiment of this application. It may be understood that with the inspection for obfuscated commands, the first features may be further increased or reduced. This is not limited in this embodiment of this application.

302. Determine a target second feature of each first command according to a first feature matching the first command, the target second feature being at least one second feature corresponding to the first feature, the second feature being a feature of a normal service command.

The plurality of second features may be obtained according to the following process: obtaining a plurality of known normal service commands, and determining common features of the plurality of known normal service commands as the second features. Certainly, based on a first feature, at least one normal service command matching the first feature may be alternatively obtained, and a common feature of the at least one normal service command matching the first feature is extracted, to obtain at least one second feature corresponding to the first feature, thereby improving the pertinence of filtering.

For each first feature, that is, each type of obfuscation type, a corresponding second feature is constantly updated and maintained. For example, when any command is determined as a normal service command, according to a first feature matching the command, a second feature corresponding to the first feature may be updated, and a specific updating process thereof is the same as the feature obtaining process. Details are not described herein.

For example, the determining any command as a normal service command may be performed in a misreporting scenario, so that the computer device may update the second feature based on a misreporting status. That is, the method further includes: when a misreporting notification of any command is received, updating, based on a first feature matching the command, a second feature corresponding to the first feature, where the misreporting notification is used for indicating that the command that is actually a normal service command is alerted as an obfuscated command. For example, the command is used as one of normal service commands used for obtaining a second feature corresponding to the first feature, to obtain the second feature again. In an embodiment, when an omission notification of any command is received, based on a first feature matching the command, a second feature corresponding to the first feature may be updated, where the omission notification is used for indicating that the command that is actually an obfuscated command is determined as a normal service command. For example, the command is deleted from a normal service command of the second feature corresponding to the first feature, to obtain the second feature again. Through updating based on a misreporting or omission status, the misreporting or omission can be converged, adjusted, and controlled.

For any first feature, when any command matches the first feature, it cannot be determined that the first command is an obfuscated command. In this case, the first command may be alternatively a normal service command. Therefore, the first command may be further determined based on the processes in step 302 and step 303 by using features included in a normal service command, to reduce a misjudgment rate, and improve the inspection accuracy.

In the matching process in step 301, the computer device may mark the first command based on a matching result, for example, adding a feature marker of the matched first feature to the first command, so that when feature matching is performed based on the second features, matching may be performed, according to a feature marker of each first command, on the first command and a target second feature of the first command, to implement further determination.

303. Perform feature matching on the plurality of first commands according to the target second feature of each first command, to determine a plurality of target commands, each of the target commands being a command having one or more of the first features but none of the second features.

The feature matching based on the second features may be performed based on the known normal service commands or regular expressions of the commands. In some embodiments, step 303 may include: performing feature matching on the plurality of first commands according to the target second feature of each first command, to determine a plurality of second commands, the second command being a first command having any target second feature; and filtering out the plurality of second commands from the plurality of first commands, to obtain the plurality of target commands.

Step 301 to step 303 show a process of inspecting a plurality of to-be-inspected commands based on a plurality of first features of known obfuscated commands and a plurality of second features of normal service commands, to determine a plurality of target commands. The plurality of first features may be regarded as a gray feature filtering ring, and the plurality of second features may be regarded as a white feature filtering ring. Through screening of the gray and white two layers of filter rings, a data volume of the to-be-inspected commands may be greatly reduced, thereby suppressing the data volume and implementing quick and prompt inspection. Each server may report commands during a relatively short period, which greatly improves real-time performance of the inspection, and can also implement timeliness of the subsequent alerting prompt.

304. Store the plurality of target commands in a target database, the target database being configured to store the target commands and corresponding running state text.

Through the two layers of screening, the suspicious target commands may be stored in a target database, to avoid loss of commands during data processing and another situation. When stored in the database, the commands may be stored according to a target format. A database field may include command information required during analysis and prompt information required during transmission of a worksheet, which includes, but is not limited to: (1) a command; (2) an executive process, a parent process, and the like of the command, which may be used as data basis of the subsequent alerting and service analysis; (3) an event time; (4) service information, such as a person in charge of the machine, a region to which the command belongs, and corresponding IP, which may be used as data basis of the subsequent alerting and service analysis; (5) a feature marker of a successfully matched first feature, which may be used as the basis of subsequently obtaining the suspicious degree information, and if the suspicious degree information does not need to be obtained by using the first feature, this item may be not stored in the target database; and (6) running state text of the command restored by a sandbox, which may be preset to null when the target command is stored to the target database.

In this embodiment of this application, the target commands are stored by using the target database, to avoid loss of the target commands, and storage based on the target database may be more conducive to parallel processing of the commands. In some embodiments, the target commands may not be stored in a database form, but may be stored in a queue form. A specifically used storage form is not limited in this embodiment of this application.

305. Import the plurality of target commands into a sandbox debugger, execute the plurality of target commands by using the sandbox debugger, and record the running state text in a script debugging execution process.

The sandbox debugger may provide a relatively independent execution environment, so that commands executed in the sandbox debugger do not affect the operation of the system. The execution environment may be regarded as an experiment environment.

The computer device may import the plurality of target commands into the sandbox debugger one by one, execute the plurality of target commands by using the sandbox debugger, and record the running state text in a script debugging execution process one by one. Certainly, the computer device may execute the plurality of target commands in parallel based on a plurality of sandbox debuggers, and record running state text of each sandbox debugger in a script debugging execution process. A processing queue may be set for each sandbox debugger, the plurality of target commands are extracted from the target database, the plurality of target commands are added to the processing queue of the sandbox debugger, and the plurality of target commands are executed by using the sandbox debugger based on a principle of first in first out. The foregoing example is merely an example of a command execution manner of the sandbox debugger, and specifically used implementation is not limited in this embodiment of this application.

The sandbox debugger may not be implemented on the computer device, but implemented on another computer device, to avoid overuse of processing resources of the current computer device, and speed up the inspection process for commands. Certainly, the computer device may be a device provided with a firewall, and the another computer device may also be a device provided with a firewall, so that during execution, the fire wall prevents some malicious behaviors and protects the device, to further improve the security of the inspection.

In an example, the computer device may execute an sh script including the command in an "sh-x" manner, and records running state text during a script debugging execution process. For example, the foregoing process is shown in the following code. An obfuscated command "a=ca;b=t; c=pas;d=swd;$a$b/etc/$c$d" of a variable substitution type in a script file sh_x_sandbox_test.sh may obtain running state text thereof by using "sh-x", and using an original command "cat/etc/passwd" as an example, the obtained running state text thereof may be +cat/etc/passwd (as shown in the last row of the code).

[root@VM_0_3_centos~]#sh-x sh_x_sandbox_test.sh
+a=ca
+b=t
+c=pas
+d=swd
+cat/etc/passwd In some embodiments, the processing speed of the sandbox debugger may be increased. For example, a target duration of each target command may be set as the maximum execution duration for the sandbox debugger, so that an execution time taken by the sandbox debugger executing any target command is less than the target duration. For example, a script execution time may be limited by using a "timeout" function. For example, it is limited that execution of a script does not exceed 0.01 s. In another example, code that invokes the sandbox debugger may be modified, so that the code does not execute any target command. That is, bash code that execute the sandbox debugger is modified, and the code logic of an execution portion is commented, to achieve the objective of not executing any target command.

Through the foregoing processes of importing and executing commands, the running state text of actually executed commands may be restored, to achieve the deobfuscation, so that the subsequent obtaining of the suspicious degree information may be performed by using the restored running state text.

306. Store, when running state text of any target command is obtained, the running state text in a storage location of the target command in the target database.

After obtaining running state text of any target command, the computer device may update the target database based on the running state text of the target command, so that a data item corresponding to the target command includes the command and a result obtained after deobfuscation is performed on the command, that is, the running state text.

307. Obtain suspicious degree information of the plurality of target commands based on the plurality of target commands and the corresponding running state text.

In this embodiment of this application, the computer device may obtain suspicious degree information of the plurality of target commands according to one or a combination of any two of the following information:

(1) First Features Matching the Plurality of Target Commands.

When the suspicious degree information is obtained based on matched first features, the computer device may obtain suspicious degree information of first features matching the plurality of target commands; and accumulate suspicious degree information of the first features matching the plurality of target commands, to obtain the suspicious degree information of the plurality of target commands. Suspicious degree information of each first feature may be preset to be used when being obtained.

Certainly, when one target command matched one first feature, suspicious degree information corresponding to the first feature may be used as suspicious degree information of the target command. When one target command matches a plurality of first features, the suspicious degree information may be obtained based on suspicious degree information of the plurality of first features. The first features may be provided with suspicious degree information, so that the suspicious degree information of the target command may be an accumulated value of the suspicious degree information of the first features.

In some embodiments, for first features of different obfuscation types, based on a quantity of first features included in obfuscation types matching the target command and a total quantity of matched first features, weights corresponding to the obfuscation types may be alternatively obtained, to obtain the suspicious degree information of the target command. For example, when a total quantity of first features matching the target command is L, where a quantity of first features of a first obfuscation type is M, and a quantity of first features of a second obfuscation type is N, M/L may be used as a weight of the first obfuscation type, and N/L may be used as a weight of the second obfuscation type. When the suspicious degree information of the target command is calculated, the suspicious degree information of the target command may be obtained through (an accumulated value of suspicious degree information of the first features of the first obfuscation type)*M/L+(an accumulated value of suspicious degree information of the first features of the second obfuscation type)*N/L.

If the suspicious degree information is set specific to an obfuscation type, obfuscation types corresponding to first features matching a target command may be determined, and then suspicious degree information corresponding to the obfuscation types are accumulated, to obtain suspicious degree information of the target command. For example, suspicious degree information of high-risk features such as IFS misusing and base64 encoding may be set to be 1. When a target command matches both of the two obfuscation types of IFS misusing and base64 encoding, suspicious degree information of the target command may be obtained as 2.

(2) Text Differences Between the Plurality of Target Commands and the Corresponding Running State Text.

When suspicious degree information is obtained based on a text difference between a target command and corresponding running state text, the computer device may obtain text differences between the plurality of target commands and the corresponding running state text; determine the suspicious degree information of the plurality of target commands according to the text differences of the plurality of target commands and a text difference threshold. Because the running state text is actually a deobfuscated command, by performing text comparison between a command and a deobfuscated command, whether the command is changed before and after the deobfuscation may be determined. If a significant change occurs, the target command may be actually an obfuscated command. The text differences may be obtained by using a SimHash algorithm. SimHash values in a running state format returned by the target command and the sandbox debugger are calculated, and a hamming distance between the two SimHash values is calculated. If the hamming distance between the two SimHash values exceeds a preset text difference threshold, it is considered that there is a significant text difference before and after sandbox debugging, so that a target value may be obtained and used as suspicious degree information. Certainly, the suspicious degree information may be alternatively obtained based on a significant degree of the text difference, that is, different suspicious degree information may be set for different text difference degrees. When the text difference degree is indicated by using a numeric interval, correspondingly, the suspicious degree information may also be indicated by using numeric values, that is, a numeric interval to which a text difference value between a command and running state text belongs is determined, and a suspicious degree value corresponding to the numeric interval is determined, to obtain the suspicious degree information of the target command.

Using the command "cat/etc/passwd" as an example again, it is assumed that the text difference threshold is 3. When the sandbox debugger executes the command, because no obfuscation deformation is performed, a result returned by the sandbox debugger is still "cat/etc/passwd". That is, both the target command and corresponding running state text are "cat/etc/passwd". In this case, a hamming distance is 0. When obfuscation is performed by using a variable substitution type in the foregoing code segment, that is, the target command is "a=ca;b=t;c=pas;d=swd;$a$b/etc/$c$d", and running state text of the command is "cat/etc/passwd", similarly, it may be obtained through calculation that a hamming distance is 8 and exceeds the text difference threshold 3, so that the suspicious degree information may be obtained as 1.

(3) Information about Matching Between the Running State Text of the Plurality of Target Commands and at Least One Preset Command.

When suspicious degree information is obtained based on information about matching between the running state text of the plurality of target commands and at least one preset command, the computer device may perform matching on the running state text of the plurality of target commands and the at least one preset command, and obtain, when running state text of any target command successfully matches one or a combination of more than one of the at least one preset command, suspicious degree information of the target command according to a match status of the target command.

For some commands having a relatively high danger degree, a risky command base line may be set based on the commands. That is, some commands may be set in advance as a reference for measuring whether a target command is an obfuscated command, and when running state text successfully matches one or a combination of more than one of the preset commands, a target value may be obtained as the suspicious degree information. Certainly, suspicious degree information corresponding to matched preset commands may be alternatively accumulated, to obtain the suspicious degree information of the target command.

The foregoing (1) to (3) describe how to obtain the suspicious degree information of the target command based on any one of the three types of information. In some embodiments, the suspicious degree information of the target command may be alternatively obtained by using at least two of the three types of information. For example, the computer device may obtain the first suspicious degree information based on the first features matching the target command provided in (1), obtain the second suspicious degree information based on the text differences provided in (2), obtain the third suspicious degree information based on the information about matching provided in (3), and use an accumulated value of the first suspicious degree information, the second suspicious degree information, and the third suspicious degree information as the suspicious degree information of the target command, to determine whether the target command is an obfuscated command by using static features and dynamic features, which greatly reduces the possibility of misjudgment, and improve the inspection accuracy.

308. The computer device determines, when suspicious degree information of any target command satisfies a target condition, the target command as an obfuscated command.

The target condition may be that the suspicious degree information is greater than a suspicious degree threshold. Certainly, the suspicious degree information may be alternatively indicated by using a suspicious level, so that the target condition may be alternatively that the suspicious degree information is greater than a suspicious degree level threshold. This is not limited in this embodiment of this application.

Figure 4:
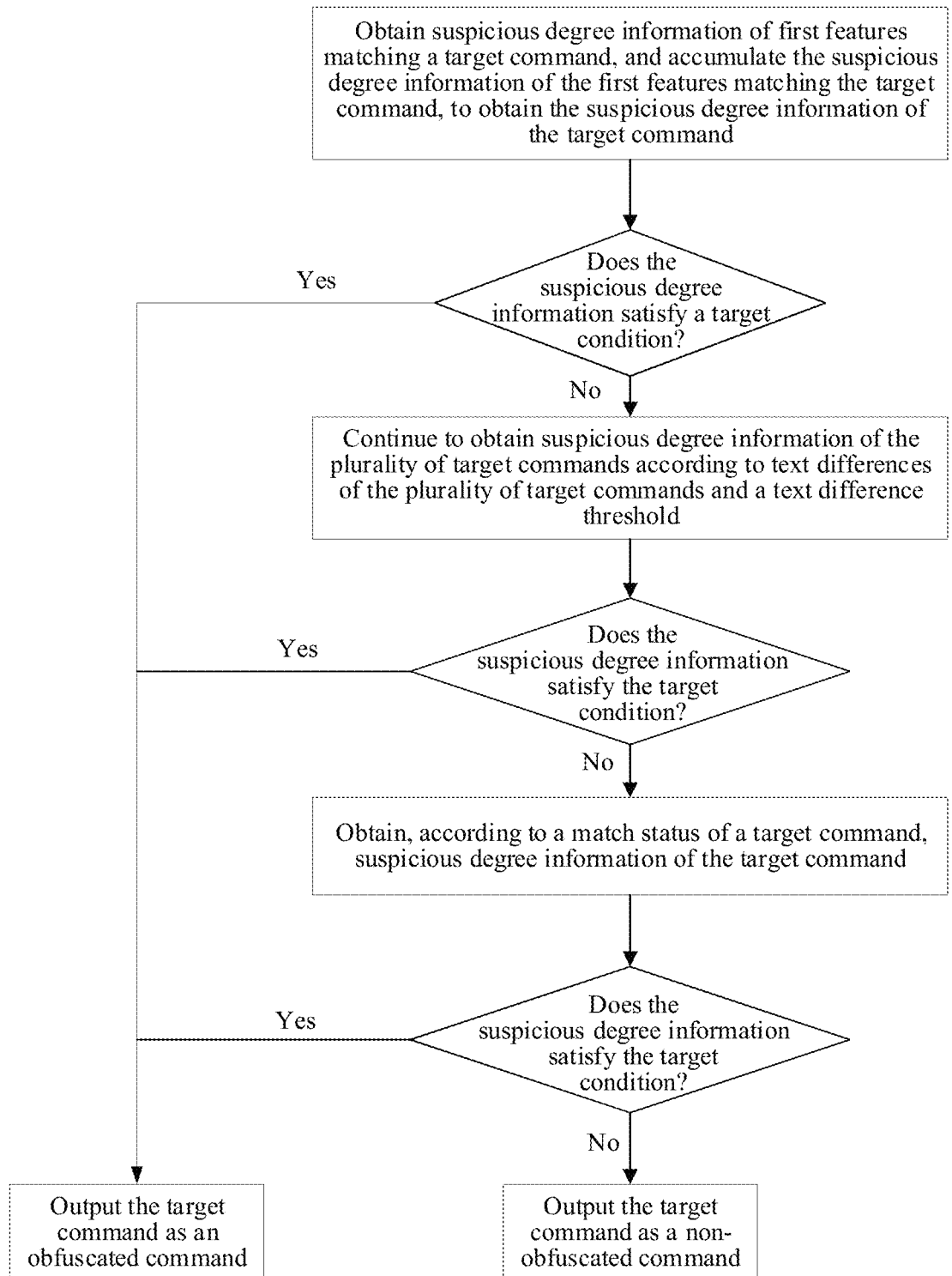
FIG. 4 is an exemplary diagram of obtaining suspicious degree information according to an embodiment of this application.

For any target command, in a process of obtaining the suspicious degree information in step 307, the process shown in FIG. 4 may be included, that is, every time some pieces of suspicious degree information are obtained, the obtained suspicious degree information are inspected, and when the obtained suspicious degree information satisfies a target condition, the target command is determined as an obfuscated command, and there is no need to wait for all the obtaining processes to complete. That is, when the suspicious degree information is obtained based on the information in (1) to (3) in step 307, if the obtained first suspicious degree information satisfies the target condition, the target command is directly determined as an obfuscated command, and there is no need to perform another obtaining process, to reduce the calculation pressure of the computer device. When the obtained suspicious degree information does not satisfy the target condition, suspicious degree information continues to be obtained in a next manner.

The process may have the following example. An example in which suspicious degree information is S, and a suspicious degree threshold is 3 is used. When an accumulated value of suspicious degree information based on the matched first features is 2, S=2. A current value of S is compared to the suspicious degree threshold 3, and it is determined that the current value is less than the suspicious degree threshold. Therefore, a value of S continues to be determined based on a text difference between the command and running state text. For example, if the text difference is greater than a text difference threshold, incremental processing is performed on S by using a unit of 2, so that S=2+2=4. In this case, it is determined that a value of S is greater than the suspicious degree threshold. Therefore, the subsequent process may not be performed, and the target command is determined as an obfuscated command.

Figure 5:
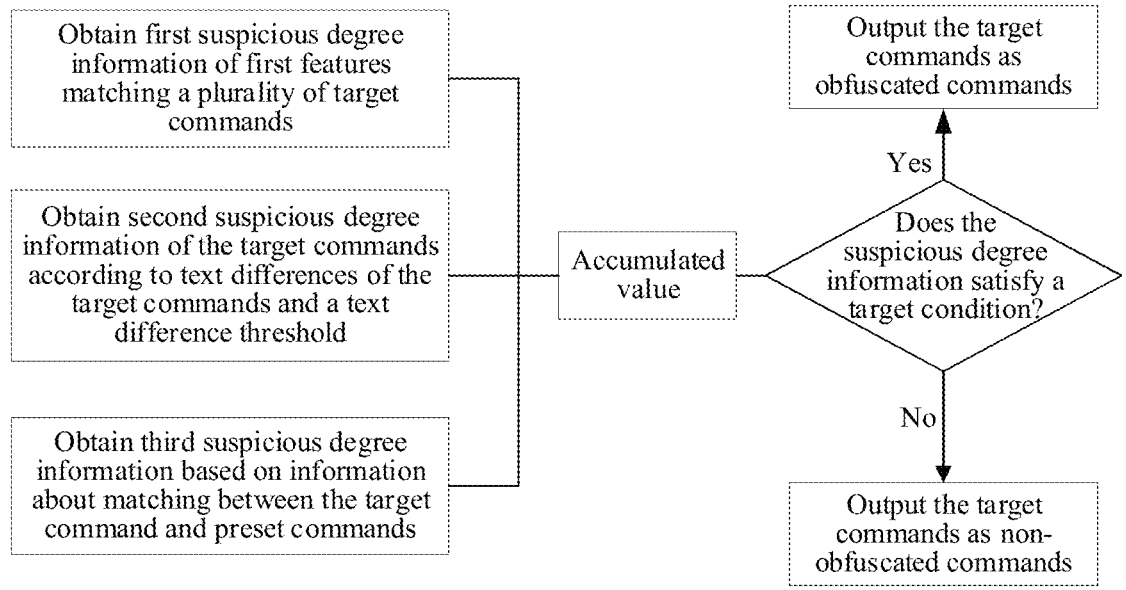
FIG. 5 is an exemplary diagram of obtaining suspicious degree information according to an embodiment of this application.

Certainly, the process of obtaining the suspicious degree information may be alternatively performed in parallel in a plurality of types of manners, and suspicious degree information obtained in the plurality of types of manners is accumulated, to obtain suspicious degree information of a command. For example, as shown in FIG. 5, corresponding suspicious degree information of a target command is respectively obtained in manners of (1), (2), and (3), accumulated values of the suspicious degree information obtained in the three manners are then obtained and used as suspicious degree information of the target command, and whether the target command is an obfuscated command is determined based on whether the suspicious degree information satisfies a target condition.

In some embodiments, when any target command is determined as an obfuscated command or a non-obfuscated command, the target command is deleted from the target database, to save the storage space.

309. Alert a source server of the target command.

The computer device may alert, based on service information of a target command that is determined as an obfuscated command, a source server of the target command. For the target command, service information of the target command is stored in the target database, and the service information may store IP information of a server. Therefore, the computer device may implement alerting based on the information. Certainly, the alerting may be alerting a source server, or may be alerting a system administrator. This is not limited in this embodiment of this application. During the alerting, mobile end alerting information, web page end alerting information, and alerting information in another form may be returned to the system administrator or a user to which the server belongs.

When any alert is determined as invasion, an emergency response process may be performed, to ensure the operation security. If any alert is determined as misreporting, a corresponding target command may be added to the normal service commands, and used for updating the second features involved in step 302, to improve accuracy of the subsequent inspection.

Figure 6:
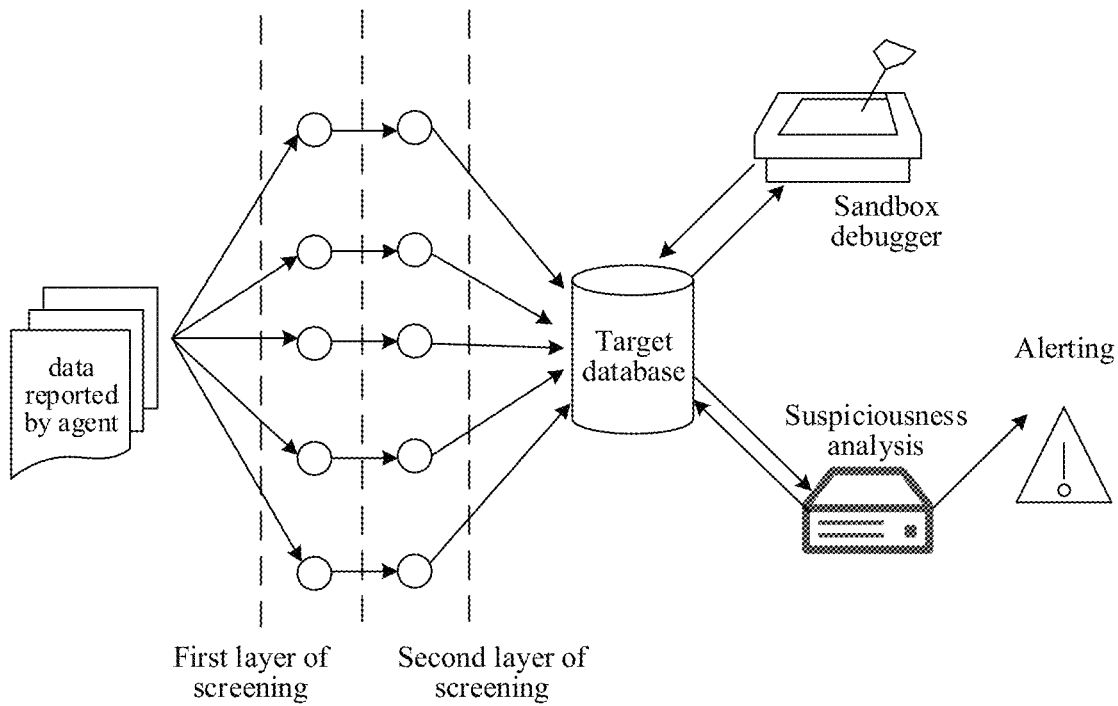
FIG. 6 is an exemplary diagram of a data flow direction in an inspection process according to an embodiment of this application.

For the foregoing process, reference may be made to the diagram of a data flow direction shown in FIG. 6. The diagram of the data flow direction intuitively shows the processing procedure of step 301 to step 309. A first layer of screening may be performed on data reported by agent based on first features, that is, gray features, and a second layer of screening is then performed based on second features, that is, white features, so that commands obtained through screening are stored in a database. Then, sandbox debugging is performed based on the commands stored in the database, to obtain running state text of each command. Comprehensive determination is performed based on the command and the running state text, a result of the determination is then outputted, and targeted and prompt alerting may be implemented based on the result of the determination.

In this embodiment of this application, for a large-scale server application scenario, an operable real-time inspection method for an obfuscated command is provided, which greatly improves the defense effect, and provides a more flexible inspection method. Specifically, analysis of static and dynamic obfuscation attributes of commands are combined in this embodiment of this application. First, static feature matching and screening are performed on reported commands by using first features obtained based on known obfuscated commands and second features obtained based on normal service commands, thereby significantly reducing the scale of data analysis, and making real-time command inspection possible, and running state text of the commands are obtained, to implement a certain degree of a deobfuscation function, avoiding a difficult in calculation and time consuming caused by semantic analysis. Then, suspicious degree information is determined by using commands and the running state text, to finally determine whether the commands are obfuscated commands, thereby greatly improving the inspection accuracy. Certainly, as the accuracy improves, the possibility of misreporting is greatly reduced. Therefore, a suspicious deformed obfuscated command is accurately recognized, the effective perception capability for advanced threat invasion means is improved, and the security protection effect of the server can also be significantly enhanced.

Further, in the embodiments of this application, three dimensions, that is, static obfuscation features of reported data, a difference degree of text formats of commands before and after sandbox analysis, and whether a deobfuscated command is abnormal, are further comprehensively considered, and whether obfuscation occurs is finally determined by using a determination condition, which can greatly improve the inspection accuracy.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with at least a part of other steps or sub-steps or stages of other steps.

Figure 7:
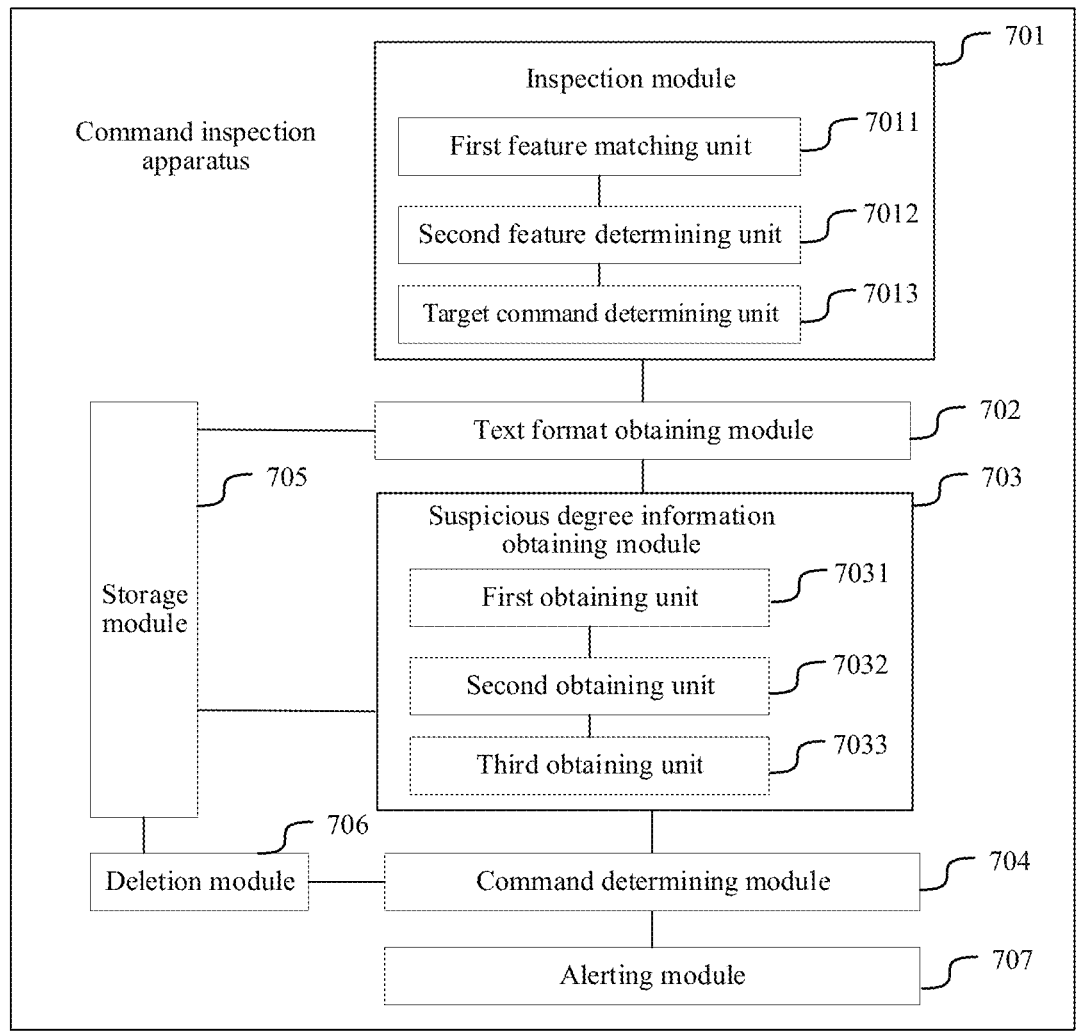
FIG. 7 is a schematic structural diagram of a command inspection apparatus according to an embodiment of this application.

FIG. 7 is a schematic structural diagram of a command inspection apparatus according to an embodiment of this application. The apparatus may be a computer device, or may be disposed in a computer device. All or some of the modules or units included in the apparatus may be implemented entirely or partly by software, hardware, or a combination thereof. Referring to FIG. 7, the apparatus includes the following:

an inspection module 701, configured to inspect a plurality of to-be-inspected commands based on a plurality of first features of known obfuscated commands and a plurality of second features of normal service commands, to determine a plurality of target commands, each of the target commands being a command having one or more of the first features but none of the second features;

a text format obtaining module 702, configured to obtain running state text of the plurality of target commands;

a suspicious degree information obtaining module 703, configured to obtain suspicious degree information of the plurality of target commands based on the plurality of target commands and the corresponding running state text, the suspicious degree information being used for indicating a possibility that a command is an obfuscated command; and a command determining module 704, configured to determine, when suspicious degree information of any target command satisfies a target condition, the target command as an obfuscated command.

In an embodiment, the inspection module 701 includes:
a first feature matching unit 7011, configured to perform feature matching on the plurality of to-be-inspected commands based on the plurality of first features, to determine a plurality of first commands successfully matching at least one of the plurality of first features;

a second feature determining unit 7012, configured to determine a target second feature of each first command according to a first feature matching the first command, the target second feature being at least one second feature corresponding to the first feature; and a target command determining unit 7013, configured to perform feature matching on the plurality of first commands according to the target second feature of each first command, to determine the plurality of target commands.

In an embodiment, the target command determining unit 7013 is configured to perform feature matching on the plurality of first commands according to the target second feature of each first command, to determine a plurality of second commands, the second command being a first command having any target second feature; and filter out the plurality of second commands from the plurality of first commands, to obtain the plurality of target commands.

In an embodiment, the text format obtaining module 702 is configured to import the plurality of target commands into a sandbox debugger, execute the plurality of target commands by using the sandbox debugger, and record the running state text in a script debugging execution process.

In an embodiment, the apparatus further includes:
a storage module 705, configured to store the plurality of target commands in a target database, the target database being configured to store the target commands and the corresponding running state text.

The storage module 705 is further configured to store, when running state text of a first target command is obtained, the running state text in a storage location of the first target command in the target database.

In an embodiment, an execution time taken by the sandbox debugger for executing any target command is less than a target duration; or code that invokes the sandbox debugger is modified, so that the code does not execute any target command.

In an embodiment, the apparatus further includes a deletion module 706, configured to delete, when a second target command is determined as an obfuscated command or a non-obfuscated command, the second target command from the target database.

In an embodiment, the suspicious degree information obtaining module 703 is configured to obtain the suspicious degree information of the plurality of target commands according to one or a combination of any two of the following information:

first features matching the plurality of target commands;
text differences between the plurality of target commands and the corresponding running state text; and
information about matching between the running state text of the plurality of target commands and at least one preset command.

In an embodiment, the suspicious degree information obtaining module 703 includes a first obtaining unit 7031. The first obtaining unit 7031 is configured to obtain suspicious degree information of the first features matching the plurality of target commands; and accumulate, for any target command, suspicious degree information of first features matching the target command, to obtain the suspicious degree information of the target command.

In an embodiment, the suspicious degree information obtaining module 703 includes a second obtaining unit 7032. The second obtaining unit 7032 is configured to obtain the text differences between the plurality of target commands and the corresponding running state text; and determine the suspicious degree information of the plurality of target commands according to the text differences of the plurality of target commands and a text difference threshold.

In an embodiment, the suspicious degree information obtaining module 703 includes a third obtaining unit 7033. The third obtaining unit 7033 is configured to perform matching on the running state text of the plurality of target commands and the at least one preset command, and obtain, when running state text of a third target command successfully matches one or a combination of more than one of the at least one preset command, suspicious degree information of the third target command according to a match status of the third target command.

In an embodiment, the apparatus further includes an alerting module 707, configured to alert a source server of the target command. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 8:
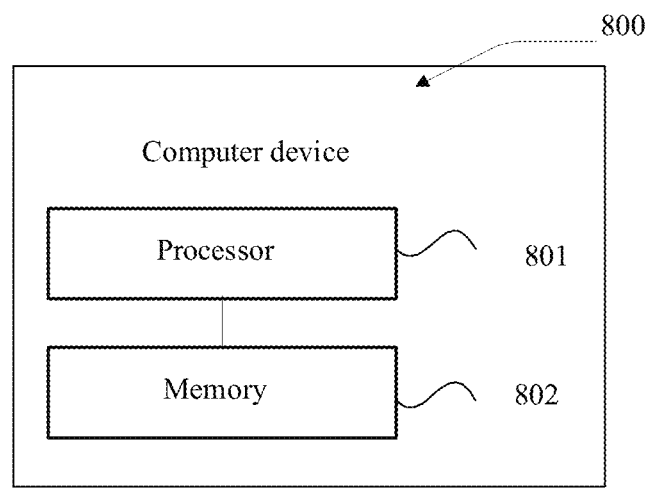
FIG. 8 is a schematic structural diagram of a computer device according to an embodiment of this application.

FIG. 8 is a schematic structural diagram of a computer device according to an embodiment of this application. The computer device may be the server 102 in the implementation environment shown in FIG. 1. The computer device 800 may vary greatly due to different configurations or performance, and may include one or more processors (central processing units (CPUs)) 801 and one or more memories 802. The memory 802 stores at least one computer-readable instruction, the at least one computer-readable instruction being loaded and executed by the one or more processors 801 to implement the command inspection method provided in the foregoing method embodiments. Certainly, the computer device may further have components such as a wired or wireless network interface, a keyboard, and an input/output interface for ease of input/output, and may further include other components for implementing functions of the device.

In an exemplary embodiment, one or more computer-readable storage mediums, such as a memory including computer-readable instructions, are further provided, and the computer-readable instructions may be executed by one or more processors in a computer device to implement the command inspection method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing related hardware related. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A command inspection method performed by a computer device, the method comprising:

inspecting a plurality of to-be-inspected commands based on a plurality of first features of known obfuscated commands and a plurality of second features of normal service commands, to determine a plurality of target commands, each of the target commands being a command having one or more of the first features but none of the second features;

obtaining running state text of the plurality of target commands, the running state text being textual commands describing operations performed by the plurality of target commands during execution and obtained during a script debugging execution process using a sandbox;

obtaining total suspicious degree information of each of the plurality of target commands, the total suspicious degree information being a total suspicious degree value used for indicating a possibility that the target command is an obfuscated command, including:

obtaining a first suspicious degree value of the target command according to first features matching the target command, each first feature having a corresponding suspicious degree value;

obtaining a second suspicious degree value of the target command according to an extent of a difference between the target command and the corresponding running state text;

adding the first suspicious degree value of the target command and the second suspicious degree value of the target command as the total suspicious degree value of the target command; and determining, when the total suspicious degree information of any target command satisfies a target condition, the target command as an obfuscated command.

2. The method according to claim 1, wherein the inspecting a plurality of to-be-inspected commands based on a plurality of first features of known obfuscated commands and a plurality of second features of normal service commands, to determine a plurality of target commands comprises:

performing feature matching on the plurality of to-be-inspected commands based on the plurality of first features, to determine a plurality of first commands successfully matching at least one of the plurality of first features;

determining a target second feature of each first command according to a first feature matching the first command, the target second feature being at least one second feature corresponding to the first feature; and performing feature matching on the plurality of first commands according to the target second feature of each first command, to determine the plurality of target commands.

3. The method according to claim 2, wherein the performing feature matching on the plurality of first commands according to the target second feature of each first command, to determine the plurality of target commands comprises:

performing feature matching on the plurality of first commands according to the target second feature of each first command, to determine a plurality of second commands, each second command being a first command having the target second feature; and filtering out the plurality of second commands from the plurality of first commands, to obtain the plurality of target commands.

4. The method according to claim 1, wherein the obtaining running state text of the plurality of target commands comprises:

importing the plurality of target commands into a sandbox debugger;

executing the plurality of target commands by using the sandbox debugger; and recording the running state text in a script debugging execution process.

5. The method according to claim 4, wherein before the importing the plurality of target commands into a sandbox debugger, the method further comprises:

storing the plurality of target commands in a target database, the target database being configured to store the target commands and the corresponding running state text.

6. The method according to claim 5, wherein after the recording the running state text in a script debugging execution process, the method further comprising:

storing, when running state text of any target command is obtained, the running state text in a storage location of the target command in the target database.

7. The method according to claim 4, wherein an execution time taken by the sandbox debugger for executing any target command is less than or equal to a target duration.

8. The method according to claim 4, further comprising:
modifying code that invokes the sandbox debugger, so that the code does not execute any target command imported into the sandbox debugger.

9. The method according to claim 4, further comprising:
deleting, when any target command is determined as an obfuscated command or a non-obfuscated command, the target command from a target database.

10. The method according to claim 4, wherein the obtaining suspicious degree information of the plurality of target commands based on the plurality of target commands and the corresponding running state text comprises:
obtaining the suspicious degree information of the plurality of target commands according to at least one of the following information:
the first features matching the plurality of target commands;
text differences between the plurality of target commands and the corresponding running state text; and
information about matching between the running state text of the plurality of target commands and at least one preset command.

11. The method according to claim 10, wherein the obtaining suspicious degree information of the plurality of target commands based on the plurality of target commands and the corresponding running state text comprises:
obtaining suspicious degree information of the first features matching the plurality of target commands; and
accumulating, for any target command, suspicious degree information of first features matching the target command, to obtain the suspicious degree information of the target command.

12. The method according to claim 10, wherein the obtaining suspicious degree information of the plurality of target commands based on the plurality of target commands and the corresponding running state text comprises:
obtaining the text differences between the plurality of target commands and the corresponding running state text; and
determining the suspicious degree information of the plurality of target commands according to the text differences of the plurality of target commands and a text difference threshold.

13. The method according to claim 10, wherein the obtaining suspicious degree information of the plurality of target commands based on the plurality of target commands and the corresponding running state text comprises:
performing matching on the running state text of the plurality of target commands and the at least one preset command, and obtaining, when running state text of a third target command successfully matches one or a combination of more than one of the at least one preset command, suspicious degree information of the third target command according to a match status of the third target command.

14. The method according to claim 1, further comprising:
alerting a source server of the target command; and
alerting an administrator terminal based on the target command.

15. A computer device, comprising one or more processors and a memory, the memory storing at least one computer-readable instruction, the computer-readable instruction being loaded and executed by the one or more processors to perform a plurality of operations including:
inspecting a plurality of to-be-inspected commands based on a plurality of first features of known obfuscated commands and a plurality of second features of normal service commands, to determine a plurality of target commands, each of the target commands being a command having one or more of the first features but none of the second features;
obtaining running state text of the plurality of target commands, the running state text being textual commands describing operations performed by the plurality of target commands during execution and obtained during a script debugging execution process using a sandbox;
obtaining total suspicious degree information of each of the plurality of target commands, the total suspicious degree information being a total suspicious degree value used for indicating a possibility that the target command is an obfuscated command, including:
obtaining a first suspicious degree value of the target command according to first features matching the target command, each first feature having a corresponding suspicious degree value;
obtaining a second suspicious degree value of the target command according to an extent of a difference between the target command and the corresponding running state text;
adding the first suspicious degree value of the target command and the second suspicious degree value of the target command as the total suspicious degree value of the target command; and
determining, when the total suspicious degree information of any target command satisfies a target condition, the target command as an obfuscated command.

16. The computer device according to claim 15, wherein the inspecting a plurality of to-be-inspected commands based on a plurality of first features of known obfuscated commands and a plurality of second features of normal service commands, to determine a plurality of target commands comprises:
performing feature matching on the plurality of to-be-inspected commands based on the plurality of first features, to determine a plurality of first commands successfully matching at least one of the plurality of first features;
determining a target second feature of each first command according to a first feature matching the first command, the target second feature being at least one second feature corresponding to the first feature; and
performing feature matching on the plurality of first commands according to the target second feature of each first command, to determine the plurality of target commands.

17. The computer device according to claim 16, wherein the performing feature matching on the plurality of first commands according to the target second feature of each first command, to determine the plurality of target commands comprises:
performing feature matching on the plurality of first commands according to the target second feature of each first command, to determine a plurality of second commands, each second command being a first command having the target second feature; and filtering out the plurality of second commands from the plurality of first commands, to obtain the plurality of target commands.

18. The computer device according to claim 15, wherein the obtaining running state text of the plurality of target commands comprises:
importing the plurality of target commands into a sandbox debugger;
executing the plurality of target commands by using the sandbox debugger; and
recording the running state text in a script debugging execution process.

19. The computer device according to claim 18, wherein the plurality of operations further comprise:
modifying code that invokes the sandbox debugger, so that the code does not execute any target command imported into the sandbox debugger.

20. One or more non-transitory computer-readable storage mediums, storing at least one computer-readable instruction, the computer-readable instruction being loaded and executed by one or more processors of a computer device to perform a plurality of operations including:
inspecting a plurality of to-be-inspected commands based on a plurality of first features of known obfuscated commands and a plurality of second features of normal service commands, to determine a plurality of target commands, each of the target commands being a command having one or more of the first features but none of the second features;
obtaining running state text of the plurality of target commands, the running state text being textual commands describing operations performed by the plurality of target commands during execution and obtained during a script debugging execution process using a sandbox;
obtaining total suspicious degree information of each of the plurality of target commands, the total suspicious degree information being a total suspicious degree value used for indicating a possibility that the target command is an obfuscated command, including:
obtaining a first suspicious degree value of the target command according to first features matching the target command, each first feature having a corresponding suspicious degree value;
obtaining a second suspicious degree value of the target command according to an extent of a difference between the target command and the corresponding running state text;
adding the first suspicious degree value of the target command and the second suspicious degree value of the target command as the total suspicious degree value of the target command; and
determining, when the total suspicious degree information of any target command satisfies a target condition, the target command as an obfuscated command.

* * * * *